(12) United States Patent
Kumar et al.

(10) Patent No.: US 11,057,274 B1
(45) Date of Patent: Jul. 6, 2021

(54) SYSTEMS AND METHODS FOR VALIDATION OF VIRTUALIZED NETWORK FUNCTIONS

(71) Applicant: Verizon Patent and Licensing Inc., Arlington, VA (US)

(72) Inventors: Abhishek Kumar, Karnataka (IN); Ravi Potluri, Coppell, TX (US); Hans Raj Nahata, New Providence, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/844,567

(22) Filed: Apr. 9, 2020

(51) Int. Cl.
| | | |
|---|---|---|
| *G06F 15/16* | (2006.01) | |
| *G06F 9/54* | (2006.01) | |
| *H04L 29/06* | (2006.01) | |
| *H04L 12/24* | (2006.01) | |
| *G06F 9/455* | (2018.01) | |

(52) U.S. Cl.
CPC ...... *H04L 41/0893* (2013.01); *G06F 9/45558* (2013.01); *G06F 2009/45587* (2013.01); *G06F 2009/45595* (2013.01)

(58) Field of Classification Search
CPC .................................................. H04L 41/0893
USPC ........................................................ 709/223
See application file for complete search history.

(56) References Cited

U.S. PATENT DOCUMENTS

| | | | | |
|---|---|---|---|---|
| 9,386,001 B1* | 7/2016 | Marquardt | ............... | H04L 12/66 |
| 10,042,662 B1* | 8/2018 | Marquardt | ............... | G06F 21/53 |
| 10,671,439 B1* | 6/2020 | Frandzel | ................. | G06F 3/067 |
| 10,862,760 B2* | 12/2020 | Caldwell | ............. | G06F 9/45558 |
| 2016/0344507 A1* | 11/2016 | Marquardt | .......... | H04J 14/0227 |
| 2016/0373474 A1* | 12/2016 | Sood | ........................ | G06F 21/50 |
| 2017/0339247 A1* | 11/2017 | Tiwari | ............... | H04L 41/0806 |
| 2018/0026992 A1* | 1/2018 | Paczkowski | ........ | G06F 9/45558 |
| | | | | 726/4 |
| 2019/0052549 A1* | 2/2019 | Duggal | ................. | G06Q 30/04 |
| 2019/0121960 A1* | 4/2019 | Brown | ................. | G06F 9/5077 |
| 2019/0253264 A1* | 8/2019 | Singaravelu | .......... | H04L 9/3263 |

(Continued)

OTHER PUBLICATIONS

P. Twamley et al., "5GTANGO: An Approach for Testing NFV Deployments," 2018 European Conference on Networks and Communications (EuCNC), Ljubljana, Slovenia, 2018, pp. 1-218, doi: 10.1109/EuCNC.2018.8442844. (Year: 2018).*

(Continued)

*Primary Examiner* — Hamza N Algibhah

(57) ABSTRACT

Provided are systems and methods for automating the deployment of software-defined and/or virtualized network functions ("xNFs") within a network via a holistic validation of each xNF against validation criteria and/or performance of prior xNFs. The holistic validation may include receiving an xNF, determining a first amount of risk associated with that xNF based on one or more differences between the xNF and the validation criteria, determining a second amount of risk by comparing performance characteristics of the xNF to performance characteristics of earlier version of the same or similar xNFs, providing the xNF to the network for deployment in response to the total risk being within an acceptable amount of risk, and preventing xNF deployment while providing a notification with a set of recommendations to reduce the xNF risk in response to the total risk exceeding the acceptable amount of risk.

20 Claims, 8 Drawing Sheets

(56) References Cited

U.S. PATENT DOCUMENTS

| | | | |
|---|---|---|---|
| 2020/0067782 A1* | 2/2020 | Yousaf | H04L 41/0896 |
| 2020/0272859 A1* | 8/2020 | Iashyn | G06F 9/5077 |
| 2020/0274852 A1* | 8/2020 | Ahmed | H04L 63/0263 |
| 2020/0412596 A1* | 12/2020 | Cherunni | G06F 9/5077 |

OTHER PUBLICATIONS

Pau Capdevila i Pujol, Master Thesis, Deployment of NFV and SFC scenarios, Feb. 17, 2017 (Year: 2017).*

O. Adamuz-Hinojosa, J. Ordonez-Lucena, P. Ameigeiras, J. J. Ramos-Munoz, D. Lopez and J. Folgueira, "Automated Network Service Scaling in NFV: Concepts, Mechanisms and Scaling Workflow," in IEEE Communications Magazine, vol. 56, No. 7, pp. 162-169, Jul. 2018, doi: 10.1109/MCOM.2018.1701336. (Year: 2018).*

ETSI GS NFV-IFA 011 V2.6.1 (Mar. 2019), "Network Functions Virtualisation (NFV) Release 2; Management and Orchestration; VNF Descriptor and Packaging Specification," Mar. 2019 (available at https://www.etsi.org/deliver/etsi_gs/NFVIFA/001_099/011/02.06.01_60/gs_nfv-ifa011v020601p.pdf, accessed on Apr. 9, 2020).

ETSI GS NFV-SOL 002 V2.6.1 (Apr. 2019), "Network Functions Virtualisation (NFV) Release 2; Protocols and Data Models; RESTful protocols specification for the Ve-Vnfm Reference Point," Apr. 2019 (available at https://www.etsi.org/deliver/etsi_gs/NFVSOL/001_099/002/02.06.01_60/gs_nfv-sol002v020601p.pdf, accessed on Apr. 9, 2020).

ETSI GS NFV-SOL 003 V2.6.1 (Apr. 2019), "Network Functions Virtualisation (NFV) Release 2; Protocols and Data Models; RESTful protocols specification for the Or-Vnfm Reference Point," Apr. 2019 (available at https://www.etsi.org/deliver/etsi_gs/NFVSOL/001_099/003/02.06.01_60/gs_nfv-sol003v020601p.pdf, accessed on Apr. 9, 2020).

Oasis, "TOSCA Simple Profile in YAML Version 1.2," Jan. 2019 (available at https://docs.oasis-open.org/tosca/TOSCA-Simple-Profile-YAML/v1.2/TOSCA-Simple-Protile-YAML-v1.2.html, accessed on Apr. 9, 2020).

ETSI GS NFV-SOL 001 V2.6.1 (May 2019), "Network Functions Virtualisation (NFV) Release 2; Protocols and Data Models; NFV descriptors based on TOSCA specification," May 2019 (available at https://www.etsi.org/deliver/etsi_gs/NFVSOL/001_099/001/02.06.01_60/gs_nfv-sol001v020601p.pdf, accessed on Apr. 9, 2020).

ETSI GS NFV-SOL 005 V2.6.1 (Apr. 2019), "Network Functions Virtualisation (NFV) Release 2; Protocols and Data Models; RESTful protocols specification for the Os-Ma-nfvo Reference Point," Apr. 2019 (available at https://www.etsi.org/deliver/etsi_gs/NFVSOL/001_099/005/02.06.01_60/gs_nfv-sol005v020601p.pdf, accessed on Apr. 9, 2020).

ETSI GS NFV-SOL 007 V2.6.1 (Mar. 2019), "Network Functions Virtualisation (NFV) Release 2; Protocols and Data Models; Network Service Descriptor File Structure Specification," Mar. 2019 (available at https://www.etsi.org/deliver/etsi_gs/NFVSOL/001_099/001/02.06.01_60/gs_nfv-sol001v020601p.pdf, accessed on Apr. 9, 2020).

Onap, "Latest VES Listener 7.1 and Registration 3.2 Requirements," Dec. 2018 (available at https://lists.onap.org/g/onap-discuss/topic/28813894?p=, accessed on Apr. 9, 2020).

* cited by examiner

SYSTEMS AND METHODS FOR VALIDATION OF VIRTUALIZED NETWORK FUNCTIONS

BACKGROUND

Software-defined networking and/or network function virtualization may allow network functions of a wireless telecommunications network to execute from reconfigurable resources of function-agnostic hardware.

DETAILED DESCRIPTION OF THE PREFERRED EMBODIMENTS

Figure 1:
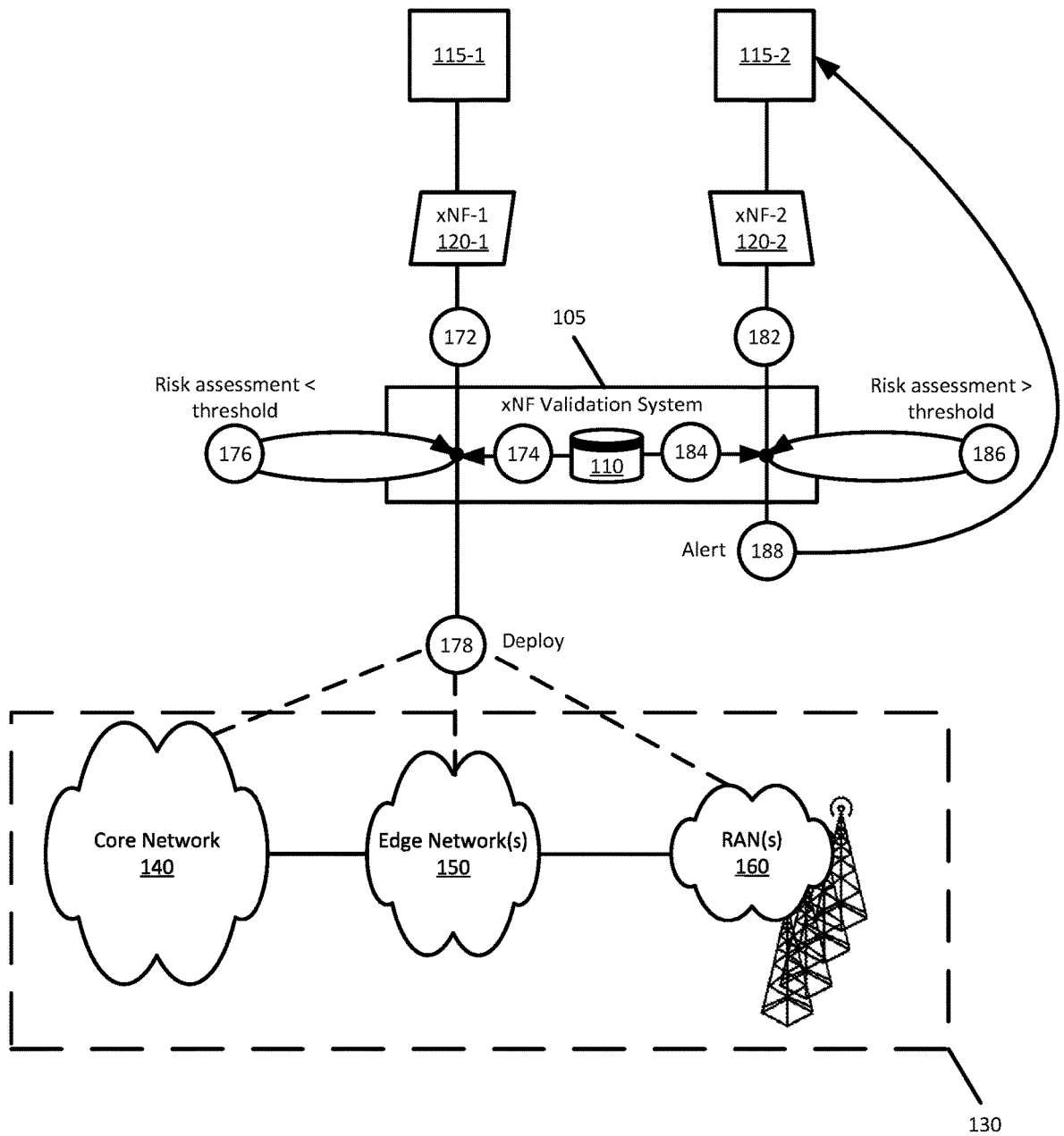
FIG. 1 illustrates an example of automated software-defined and/or virtualized network function ("xNF") validation in accordance with some embodiments presented herein.

The following detailed description refers to the accompanying drawings. The same reference numbers in different drawings may identify the same or similar elements.

Systems and/or methods, as described herein, may automate the deployment of xNFs within a wireless network and/or other network. The automated deployment may include holistically validating each xNF. The holistic validation may include comprehensively validating the structure, syntactic grammar, integrity, features, security, release history, configuration, and/or other aspects of the xNF against validation criteria, and/or validating various performance characteristics of a newly received xNF against the performance characteristics of related xNFs. The automated deployment may determine operational risk of an xNF based on the holistic validation, and may execute the network functions of that xNF from available configurable resources associated with the wireless network when the operational risk is acceptable. As described herein, if operational risk is determined to be unacceptable, embodiments described herein may prevent execution of the xNF, may provide recommendations for modifying parameters associated with the xNF and/or the wireless network, and/or may perform other remedial measures. The operational risk associated with a given xNF may quantify, and/or may otherwise based on, a calculated likelihood that the xNF will fail, execute with performance below a threshold, and/or will otherwise execute improperly when deployed into the wireless network and/or other network.

In some embodiments, the holistic validation may store different validation criteria for different xNFs, and may validate feature compliance of a particular xNF using the validation criteria for that particular xNF. In some embodiments, the holistic validation of the particular xNF may include simulating or executing the particular xNF, and comparing the resulting performance characteristics against historical performance characteristics of previous versions of the same or similar xNF. In some embodiments, machine learning, artificial intelligence, and/or other suitable techniques may be used to adapt xNF attributes included in the validation criteria, weights associated with xNF attributes, xNF performance thresholds, weights assigned to xNF performance thresholds, risk thresholds, and/or other attributes described herein.

The validation criteria, against which a given xNF may be evaluated, may be used to validate the structure, syntactic grammar, integrity, features, security, release history, configuration, performance, and/or other attributes of the xNF. A risk assessment score that quantifies the operational risk of executing an xNF may be computed for the xNF based on compliance or non-compliance of these and/or other attributes with the validation criteria, tracked performance of previous versions of the same or similar xNF, and/or adaptive weights that are assigned to each attribute and each performance characteristic.

In some embodiments, xNFs that are successfully validated (e.g., determined to have a quantified measure of risk that is below a threshold amount of risk) may be deployed to a set of configurable hardware resources. The configurable hardware resources may include computing, memory, storage, networking, and/or other resources that can be dynamically reconfigured with different xNFs to provide different network functions of the wireless network and/or other network. The set of configurable hardware resources may, in some embodiments, be implemented by a virtualized system (such as a "cloud" computing platform), a set of discrete hardware resources, and/or some other suitable set of hardware resources. Each xNF may include a virtualized network function ("vNF"), a containerized network function ("cNF"), and/or some other software-defined network function that provides control plane and/or user plane functionality for one or more portions of a wireless network, such as one or more Radio Access Networks ("RANs"), edge networks, core network, etc. of the wireless network.

FIG. 1 illustrates an example of automated xNF validation in accordance with some embodiments presented herein. As shown in FIG. 1, some embodiments may include xNF validation system 105, xNF originators 115-1 and 115-2, and xNFs 120-1 and 120-2, operating in conjunction with network 130. Network 130 may correspond to a wireless network with core network 140, one or more edge networks 150, and one or more RANs 160. xNF originators 115-1 and 115-2 may sometimes be collectively referred to as "xNF originators 115" or individually as "xNF originator 115", and may include devices, interfaces, and/or portals of vendors from which network 130 may obtain different xNFs 120-1 and 120-2. Similarly, xNFs 120-1 and 120-2 may sometimes be collectively referred to as "xNFs 120" or individually as "xNF 120". Each xNF 120 may provide a set of network functions for different control plane or user plane functionality of network 130.

As shown in FIG. 1, xNF originator 115-1 may provide (at 172) xNF 120-1 to xNF validation system 105. xNF originator 115-1 may be authorized and/or registered to provide certain virtualized network functionality for network 130, and may upload (at 172) xNF 120-1 to xNF validation system 105 via a network, interface, portal, and/or some other suitable communication pathway.

xNF 120-1 may be provided in the form of a package, container, or another format that provides an executable instance of the network functions virtualized by xNF 120-1. For example, xNF 120-1 may be provided in accordance with a Kubernetes application programming interface ("API"), a Docker API, and/or some other suitable API or protocol. In some embodiments, the network functions virtualized by xNF 120-1 may be provided as a virtual machine, image, or an executable application.

xNF validation system 105 may classify xNF 120-1 based on an xNF type, network function, and/or other classifying data of xNF 120-1, and may select (at 174) specific validation criteria and/or performance data from repository 110 based on the xNF classification. Repository 110 may store different validation criteria and/or performance data for performing different xNF validations to account for attribute, performance, and/or other differences in xNFs 120 of different classifications.

xNF validation system 105 may perform (at 176) a risk assessment of xNF 120-1 using the selected (at 174) validation criteria and/or performance data. The risk assessment may determine feature and/or performance compliance of xNF 120-1. In some embodiments, xNF validation system 105 may generate a score to quantify different attributes of xNF 120-1 that were compliant or non-compliant with the validation criteria selected (at 174) for xNF 120-1, and/or to quantify different performance characteristics of xNF 120-1 that were better or worse than performance characteristics of one or more previous instances of xNF 120-1 or similar xNFs 120 (e.g., xNFs 120 which had one or more attributes in common with xNF 120-1, and/or that have a similarity to xNF 120-1 that exceeds a threshold measure of similarity) using the performance data select (at 174) for xNF 120-1. The risk assessment may include comparing the resulting score to a threshold that may be specific to the particular network function that is virtualized and/or provided by xNF 120-1. Examples of risk assessments for different xNFs are provided below In some embodiments, the risk assessment and scoring may provide different weights to xNF attributes and/or performance characteristics. In some embodiments, xNF validation system 105 may use machine learning, artificial intelligence, and/or other suitable techniques to identify the attributes and/or performance characteristics that contribute to the operational risk of different network functions, and to adjust the weight for each attribute and/or performance characteristic accordingly.

xNF validation system 105 may deploy (at 178) xNF 120-1 into wireless telecommunications network 130 after determining that the risk assessment for xNF 120-1 is within an acceptable amount of risk. In some embodiments, deployment (at 178) of xNF 120-1 may include installing, configuring, and/or running xNF 120-1 on one or more devices from available configurable hardware resources, and providing core network 140, edge network 150, and/or RAN 160 network functionality via execution of xNF 120-1 on the configurable hardware resources. In some embodiments, deployment (at 178) of xNF 120-1 may include identifying historical information associated with a set of devices and/or configurable hardware resource that executed a previous version and/or instance of xNF 120-1, and updating the set of devices to execute the current version of xNF 120-1. The previous version and/or instance of xNF 120-1 may have been obtained from xNF originator 115-1 at an earlier time, and may contain one or more differences in terms of structure, integrity, security, functionality, performance, and/or operation than a current version and/or instance of xNF 120-1 that is being validating for deployment into network 130.

FIG. 1 also illustrates xNF validation system 105 receiving (at 182) xNF 120-2 from xNF originator 115-2. xNF 120-2 may provide a different virtualized network function than xNF 120-1, or may provide a different implementation of the same virtualized network function as xNF 120-1 from a different vendor. As one example, xNF 120-1 may implement an Access and Mobility Function ("AMF"), and xNF 120-2 may implement a Session Management Function ("SMF").

xNF validation system 105 may classify xNF 120-2, and may select (at 184) different validation criteria and/or performance data from repository 110 based on a different classification of xNF 120-2 than xNF 120-1. xNF validation system 105 may perform (at 186) a risk assessment of xNF 120-2 using the selected (at 184) validation criteria and/or performance data for xNF 120-2. The risk assessment of xNF 120-2 may indicate that it is compliant for execution within network 130, or alternatively may determine that a feature and/or performance of xNF 120-2 is non-compliant, and this creates an unacceptable amount of risk for permitting xNF 120-2 to execute within network 130. The non-compliance and assessed risk may indicate that the likelihood of xNF 120-2 experiencing a failure, improper execution, and/or inadequate performance is above a threshold measure of risk, or that xNF 120-2 is likely to experience more failures, improper execution, and/or worse performance than a previously deployed instance or version of xNF 120-2.

In response to the failed validation of xNF 120-2, xNF validation system 105 may prevent xNF 120-2 from being deployed and/or executed in network 130. xNF validation system 105 may notify xNF originator 115-2 of the failed validation, and/or may provide (at 188) xNF originator 115-2 with a list of recommendations or failures for the source of the failed validation.

In this manner, xNF validation system 105 may efficiently yet securely manage and/or orchestrate the deployment of different xNFs 120 received from different xNF originators 115. xNF validation system 105 may enable frequent and faster updating (e.g., daily, weekly, monthly, etc.) of the network functions used to implement the control plane and/or user plane of network 130, and/or may increase the number of network functions within network 130 that can be virtualized to run on configurable hardware resources which, in turn, allows network 130 to dynamically scale in response to fluctuating demand.

Figure 2:
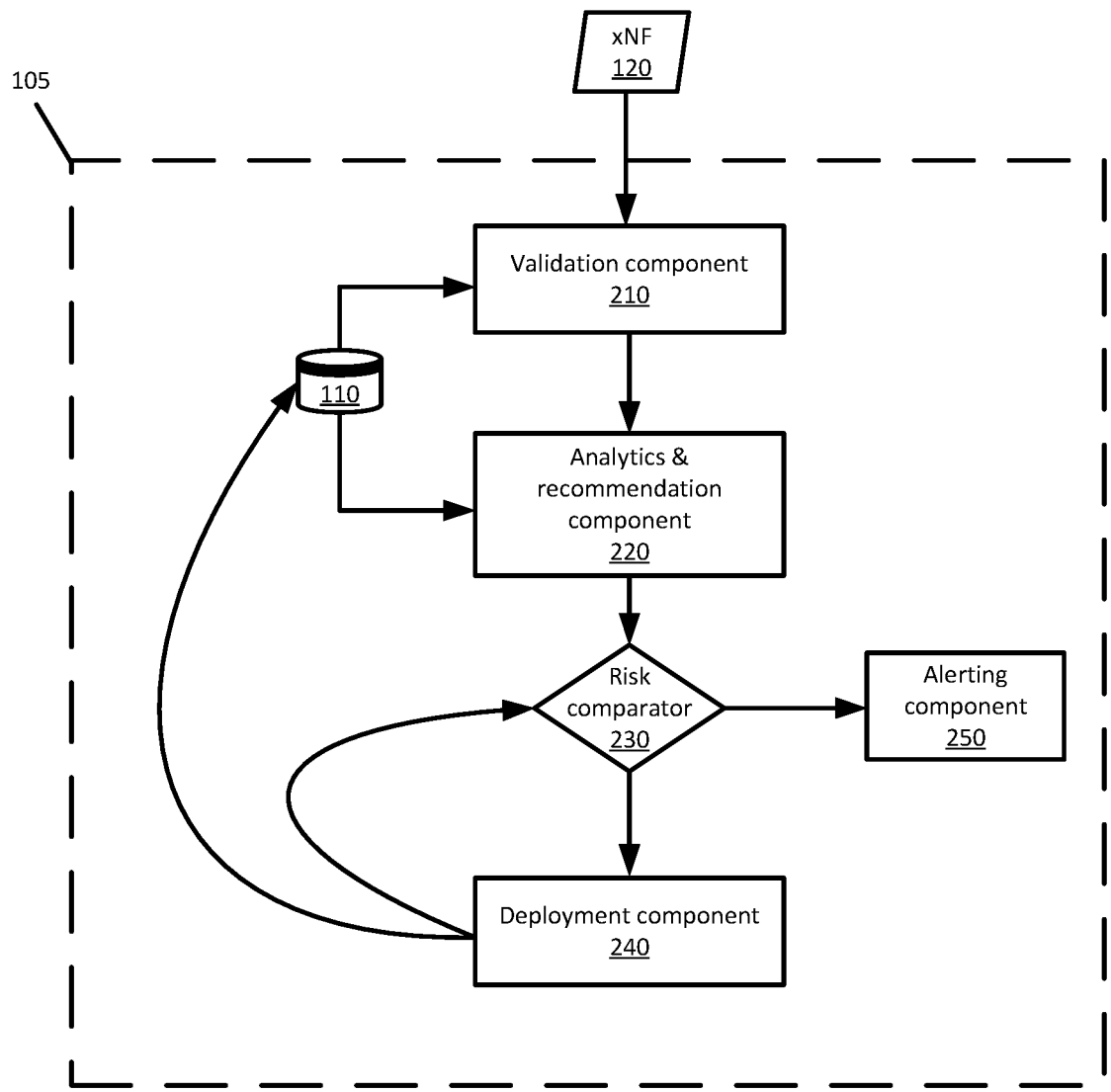
FIG. 2 illustrates example components of an xNF validation system in accordance with some embodiments presented herein.

FIG. 2 illustrates example components of xNF validation system 105 in accordance with some embodiments presented herein. As shown, xNF validation system 105 may include repository 110, validation component 210, analytics and recommendation component 220, risk comparator 230, deployment component 240, and alerting component 250. In some embodiments, xNF validation system 105 may include additional or different components than the components illustrated in FIG. 2. Moreover, the function and/or operation of one component may be integrated with the function and/or operation of another component, or may be divided and executed from multiple components. xNF validation system 105 may execute on one or more devices of wireless telecommunications network 130, a cloud platform, or a third-party xNF orchestrator.

Validation component 210 may perform the feature compliance validation of xNFs 120. The feature compliance validation may include verifying that the structure, syntactic grammar, integrity, features, security, release history, configuration, and/or other attributes of xNF 120 match validation criteria that is defined for that xNF 120. The feature compliance validation is further described with reference to FIG. 3 below.

Analytics and recommendation component 220 may perform the performance compliance validation of xNFs 120. For instance, analytics and recommendation component 220 may compare performance characteristics of previous deployments of a particular xNF 120 or of similar xNFs 120, that are stored in repository 110, to simulated or test performance characteristics that are generated for that particular xNF 120. The performance compliance validation may ensure that the particular xNF 120 satisfies a baseline level of performance and/or will not degrade network performance prior to deployment into the network. More specifically, the performance compliance validation may verify that the particular xNF 120 executes with a similar or less amount of resources than a first threshold that is derived from tracked resource utilization of the previous deployments, and/or is able to process a similar or greater load than a second threshold that is derived from tracked responsiveness of the previous deployments. The performance compliance validation is further described with reference to FIG. 4 below.

Repository 110 may track and store different performance characteristics of xNFs 120 that are deployed and/or running as part of network 130. The performance characteristics may include key control indicators ("KCIs") and key performance indicators ("KPIs"). KCIs may include utilization of processor, memory, network, storage, and/or other resources by each xNF 120 during runtime and/or under different conditions. KPIs may include tracked and/or derived statistics such as the average response time to a request, maximum number of concurrent sessions or users, number of failures, data served, etc.

Repository 110 may store the validation criteria for different xNFs 120 and/or various deployment policies for the feature compliance validation and/or performance compliance validation. In some embodiments, the deployment policies may include rules for certain runtime functionality to be present in xNF 120. For instance, the deployment policies that are specified for a particular xNF 120 may require liveness and/or readiness probe resource definitions as part of the particular xNF 120.

Analytics and performance component 220 may produce a set of recommendations for modifications to xNF 120 based on the feature compliance validation and/or performance compliance validation. The set of recommendations may identify different validation checks that were unsuccessful, and/or may provide an explanation as to each unsuccessful validation check. For instance, the set of recommendations may identify that xNF 120 failed a structural validation check because a particular file was missing, and may further identify that xNF 120 used more memory than a previous deployed version of xNF 120. xNF originators 115 may use the set of recommendations to correct issues that prevented successful validation of xNF 120 and/or that prevented xNF 120 from being deployed within network 130. xNF originator 115 may resubmit xNF 120 for validation once xNF 120 has been modified according to the set of recommendations.

In some embodiments, analytics and performance component 220 may be configured to modify various attributes of xNF 120 in order to correct variances that were detected during the feature compliance validation and/or performance compliance validation. In some such embodiments, analytics and performance component 220 may notify xNF originator 115 of the changes that were performed in order to validate xNF 120 and ensure feature compliance and/or performance compliance. For instance, xNF 120 may be include one or more outdated or obsolete executable system files that xNF validation system 105 provides to xNF originator 115 for system compatibility and/or security. Analytics and performance component 220 may replace the executable system files in xNF 120 to reduce risk the associated with xNF 120, and may notify xNF originator 115 of the modifications to xNF 120.

Risk comparator 230 may generate a risk score for xNF 120 based on any detected feature compliance variances and/or performance compliance variances. In some embodiments, different feature compliance variances and/or different performance compliance variances may be weighted differently and given different scores. The different weights may correspond to the overall impact that each xNF 120 attribute and performance characteristic is determined to have on successful execution of xNF 120 in network 130. For instance, risk comparator 230 may assign a greater weight to a set of attributes and/or performance characteristics for a first set of xNFs 120 that perform user plane network functions in core network 140 than the same set of attributes and/or performance characteristics for a second set of xNFs 120 that perform control plane network functions in core network 140. Similarly, risk comparator 230 may assign greater weight to the set of attributes and/or performance characteristics for the first set of xNFs 120 that perform user plane network functions in core network 140 than the same set of attributes and/or performance characteristics for a third set of xNFs 120 that perform user plane network function in RANs 160.

In some embodiments, risk comparator 230 may determine the different weights based on machine learning and/or artificial intelligence detection of the impact that each xNF 120 attribute or performance characteristic has on execution of xNF 120 in network 130. For example, machine learning, artificial intelligence, and/or other suitable techniques may be used to quantify the impact of a particular xNF 120 attribute or performance characteristic according to the degree with which that particular xNF 120 attribute or performance characteristic is the detected cause for a failure, improper execution, degraded performance, and/or other aberrant behavior exhibited by xNF 120 when deployed and running as part of network 130. In some embodiments the machine learning and/or artificial intelligence may determine the causes for specific aberrant behavior by identifying a version of an xNF 120 where the aberrant behavior commenced, and by detecting changes between that version and a previous version of xNF 120. For instance, a new version of xNF 120 may experience a specific failure or a specific degraded performance characteristic that was not present in a prior version of xNF 120. Risk comparator 230 may compare the new version of xNF 120 to the prior version of xNF 120 to determine that a particular file was changed in the new version of xNF 120, and may increase the weight and/or risk associated with future changes to the particular file.

Risk comparator 230 may determine whether to deploy xNF 120 based on the risk score for xNF 120. For instance, if the risk score for xNF 120 is above a threshold risk score, this may indicate a substantial or likely risk of xNF 120 failing, executing improperly, or executing with degraded performance when deployed to run as part of network 130. In such a scenario, risk comparator 230 may prevent deployment and/or execution of xNF 120 as part of network 130.

In some embodiments, risk comparator 230 may use different score thresholds for assessing the risk of deploying and/or executing different xNFs 120 (e.g., xNFs 120 that implement different network functions). The score thresholds may specify different maximum and/or acceptable amounts of risk for different xNFs 120. For example, the risk score for high-demand latency-sensitive user plane network functions operating in edge network 150 may be compared against a lower first score threshold (e.g., a lower maximum or acceptable amount of risk) than a higher second score threshold used to assess overall risk of low-demand latency-insensitive user plane network functions operating in core network 140. In this example, the high-demand latency-sensitive user plane network functions have less margin for failure or degraded performance than the low-demand latency-insensitive user plane network functions, and are therefore deployed with a smaller risk envelope, wherein the risk envelope corresponds to a lower probability of the high-demand latency-sensitive user plane network functions experiencing a failure, improper execution, degraded performance, and/or other aberrant behavior. In some embodiments, risk comparator 230 may derive the different score thresholds for different xNFs 120 from machine learning and/or artificial intelligence. The machine learning and/or artificial intelligence may monitor load on the different xNFs 120, may determine services and/or numbers of users that are affected when different xNFs 120 experience failures, and/or may adjust the score thresholds accordingly. For instance, the machine learning and/or artificial intelligence may monitor a first xNF 120 virtualizing an AMF network function, may detect that a first number of devices or services access the AMF network function over a period of time. Similarly, the machine learning and/or artificial intelligence may monitor a second xNF 120 virtualizing an SMF network function, and may detect that a greater second number of devices or service access the SMF network function over the period of time. Accordingly, there is risk for greater disruption to network 130 if the second xNF 120 fails than if the first xNF 120 fails, and the risk tolerance for second xNF 120 may be lowered relative to the risk tolerance for first xNF 120.

In response to risk comparator 230 determining, based on the risk score and risk threshold, that the risk of failure, improper execution, and/or degraded performance for xNF 120 is too great, risk comparator 230 may activate alerting component 250. Alerting component 250 may notify xNF originator 115 and/or other entities of the failed deployment. Alerting component 250 may provide the set of recommendations, from analytics and recommendation component 220 to other various entities, that identify the compliance variances that prevented the deployment. The set of recommendations may prioritize the compliance variances to identify the variances that had the greatest impact with respect to preventing xNF 120 deployment (e.g., the greatest contribution to the risk score). In some embodiments, the set of recommendations may include actions by which xNF originator 115 may rectify each of the identified compliance variances.

Alerting component 250 may provide the notifications via a set of network messages. The network messages can include HyperText Transfer Protocol ("HTTP") messages, emails, instant messages, text messages, real-time alerts, and/or other alerts. In response to the notifications from alerting component 250 for a failed deployment of xNF 120, xNF originator 115 may modify xNF 120 according to the set of recommendations, and may submit modified xNF 120 to xNF validation system 105 for revalidation.

In response to risk comparator 230 determining, based on the risk score and risk threshold, that xNF 120 has an acceptable or minimal risk of failure, improper execution, and/or degraded performance (e.g., the computed risk for xNF 120 is below a threshold measure of risk), risk comparator 230 may provide xNF 120 to deployment component 240 for deployment. In some embodiments, risk comparator 230 may instruct or control deployment component 240 in deploying xNF 120.

In some embodiments, deployment component 240 may function as or may include an xNF orchestration component, such as Kubernetes, for xNF deployment, scaling, and/or management. For instance, deployment of xNF 120 may include deployment component 240 locating a sufficient amount of configurable hardware resources for executing the network function of xNF 120, installing xNF 120 onto the available configurable hardware resources, and/or configuring xNF 120 and/or the configurable hardware to provide a network function for core network 140, edge network 150, RANs 160, and/or other parts of network 130. For instance, when xNF 120 provides a virtualized core network function, deployment component 240 may locate available resources within core network 140 that can execute xNF 120, whereas when xNF 120 provides a virtualized RAN network function, deployment component 240 may locate available resource at one or more RANs 160 where the virtual RAN network function of xNF 120 is to be deployed. In some embodiments, deployment component 240 may deploy xNF 120 by deallocating hardware resources that were allocated to a previous version or instance of that xNF 120, and by reconfiguring those hardware resources to execute the newly deployed version or instance of xNF 120.

In some embodiments, deployment component 240 may account for actual or expected demand for the network function of xNF 120 prior to deploying xNF 120. Based on the actual or expected demand, deployment component 240 may dynamically scale the amount of resources used to execute xNF 120, and/or may dynamically scale the number of xNF 120 instances to instantiate.

In some embodiments, deployment component 240 may monitor deployed xNFs 120 in an ongoing process (e.g., periodically or intermittently). In particular, for example, deployment component 240 may add a tracker that reports performance and/or other data from a deployed xNF 120 to repository 110.

Machine learning and/or artificial intelligence may process the tracked performance and/or other data to determine variances in performance between different versions or instances of the same xNF 120, may identify changed attributes in the different versions or instances of the same xNF, and may determine the impact that different xNF 120 attributes and performance characteristics have on detected failures, improper execution, degraded performance, and/or other aberrant behavior.

For instance, based on the tracked performance and detected differences in different xNF versions or instances, the machine learning and/or artificial intelligence may use a random forest classifier algorithm to generate decision trees that correlate different sets of xNF attributes to different performance characteristics with a predicted impact that each set of xNF attributes have on a correlated performance characteristic. In some embodiments, the predicted impact may account for the likelihood that detected changes between versions of xNF 120 in one or more of the set of attributes associated with the decision tree path resulted in a performance change between those versions. In some embodiments, the predicted impact may account for the likelihood that detected changes between versions of xNF 120 in one or more of the set of attributes associated with the decision tree path caused a detected failure or improper execution that did not occur in earlier versions of xNF 120. The machine learning and/or artificial intelligence may then adjust validation criteria, performance characteristics, risk thresholds, and/or weights assigned to the different xNF 120 attributes and performance characteristics based on the predicted impacts.

In some embodiments, the machine learning and/or artificial intelligence may create different clusters that include xNF attributes that change between versions of xNF 120. The machine learning and/or artificial intelligence may assign a value to each cluster based on a predicted impact that the xNF attributes in the cluster have on a particular performance characteristic that changed in those versions of xNF 120. Alternatively, the machine learning and/or artificial intelligence may assign a value to each cluster based on a predicted impact that the xNF attributes in the cluster have on a particular performance characteristic that changed in those versions of xNF 120, and/or based on a predicted degree with which the xNF attributes in the cluster caused a detected failure or improper execution that did not occur in earlier versions of xNF 120.

The machine learning and/or artificial intelligence may use other factors to adjust one or more of the validation criteria, performance characteristics, risk thresholds, and/or weights assigned to the different xNF 120 attributes and performance characteristics. In some embodiments, the risk associated with different xNF originators 115 may be a factor. For instance, the machine learning and/or artificial intelligence may determine that a first xNF originator 115 provides xNFs 120 that have a high rate of failure and/or other issues, and a second xNF originator 115 provides xNFs 120 that have a low rate of failure and/or other issues. Accordingly, the risk threshold for xNFs 120 of the first xNF originator 115 may be reduced relative to the risk threshold for xNFs 120 of the second xNF originator 115. Alternatively, the weight or risk associated with any changed attribute in the xNFs 120 of the first xNF originator 115 may be increased relative to the weight or risk associated with any changed attribute in the xNFs 120 of the second xNF originator 115.

Figure 3:
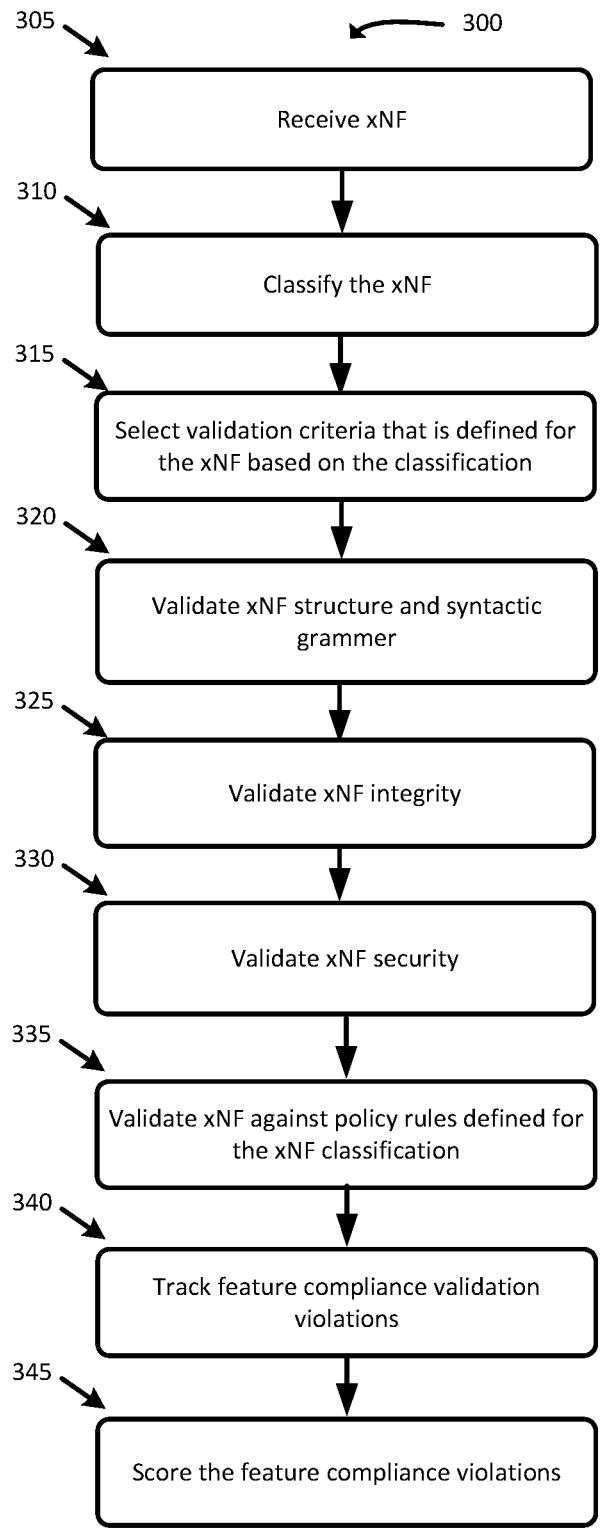
FIG. 3 presents an example process for performing xNF feature compliance validation in accordance with some embodiments presented herein.

FIG. 3 presents an example process 300 for performing the feature compliance validation in accordance with some embodiments presented herein. Process 300 may be performed by validation component 210 alone or in conjunction with risk comparator 230.

Process 300 may include receiving (at 305) xNF 120. xNF originators 115 may upload and/or register new or updated xNFs 120 to xNF validation system 105. Prior to deployment, the new or updated xNFs 120 may be provided to validation component 210 for feature compliance validation.

Process 300 may include classifying (at 310) the received (at 305) xNF 120. The classification (at 310) may be based on the metadata and/or one or more identifiers of xNF 120. The metadata and/or identifiers may specify the name, version, and/or the network function(s) virtualized by xNF 120. For instance, the name may specify that xNF 120 virtualizes distributed unit user plane ("DU-UP") operation. In some embodiments, the metadata and/or identifiers may specify a name and/or identifier (e.g., domain name, hostname, network address) of the xNF originator 115 uploading xNF 120 into xNF validation system 105. In some embodiments, the classification (at 310) may be performed by comparing attributes of the received xNF 120 with attributes of other accurately classified xNFs 120, and classifying (at 310) the received xNF 120 based on the amount of similarity with the other accurately classified xNFs 120.

Process 300 may include selecting (at 315) validation criteria for xNF 120 based on the classification (at 310) of xNF 120. Repository 110 may store different validation criteria for different xNFs 120 (e.g., different xNF types, packages, and/or virtualized network functions) or classes of xNFs, and the validation criteria may be continually changed via machine learning and/or artificial intelligence as described above. The selected validation criteria may specify a particular structure, syntactic grammar, integrity requirements, features, security requirement, release versioning, and/or other attributes for assessing the feature compliance of the received xNF 120.

Process 300 may include validating (at 320) the structure and syntactic grammar of xNF 120 according to the selected (at 315) validation criteria. The structural and/or syntactic grammar checks may be used to assess the compatibility of xNF 120 with other xNFs 120, the messaging used in network 130, and/or interfaces used by other network functions. Alternatively, the structural and/or syntactic grammar checks may determine if xNF 120 includes components, functionality, and/or elements for the network function that is virtualized by xNF 120 to execute within network 130.

In some embodiments, validating (at 320) the structure and/or syntactic grammar of xNF 120 may include verifying that the structure of xNF 120 includes certain files, directories, naming conventions, arrangement of files, and/or release versioning that are specified as part of the selected validation criteria, and/or that the files include certain fields, values, definitions, functions, and/or parameters that are specified as part of the selected validation criteria. In some embodiments, validation component 210 may use the Lint function of the Helm tool and/or other tools to perform the structural and/or syntactic grammar validation, and the validation criteria may define the structure and/or syntactic grammar checks with a Helm chart.

Process 300 may include validating (at 325) the integrity of xNF 120 according to the selected (at 315) validation criteria. The integrity validation (at 325) may verify that xNF 120 originated from a particular xNF originator 115 and/or that xNF 120 was not modified or altered during transmission to xNF validation system 105. Validation component 210 may validate (at 325) the integrity of xNF 120 using cryptographic signatures, checksums, and/or encryption keys. For instance, each xNF 120 may be uploaded to xNF validation system 105 with a signature file that is created using an encryption key of xNF originator 115. Validation component 210 may inspect the signature file and xNF 120 accompanying the signature file to determine if that xNF 120 was tampered with or altered since creation by xNF originator 115.

Process 300 may include validating (at 330) the security of xNF 120 according to the selected (at 315) validation criteria. The security validation (at 330) may include inspecting the xNF files and/or xNF package for viruses, malware, attacks, and/or other malicious code that may subject xNF 120 and/or network 130 vulnerable to attack, unauthorized access, and/or failure. The security validation (at 330) may also include by verifying that xNF 120 complies with security requirements of network 130. For instance, the security requirements may prevent xNF 120, that provides a particular network function, from communicating on certain ports or accessing certain devices in network 130.

Process 300 may include validating (at 335) that xNF 120 satisfies policy rules set forth as part of the selected (at 315) validation criteria. In some embodiments, the operator of network 130 may define and/or publish policy rules for different xNFs 120. The policy rules may specify features that xNF 120 of a particular classification is to support. A feature may correspond to functionality and/or operation of xNF 120, and feature requirements may specify messaging formats, communication protocols, interfaces, and/or configuration parameters for cross-network function and/or cross-xNF compatibility. For instance, policy rules for xNF 120 may state that xNF 120 include a liveness or readiness probe for checking the health status of that xNF 120 during execution, test cases for functional testing of xNF 120, specific resource utilization units for verifying runtime resource utilization by xNF 120, and/or specific privileges to avoid permission errors during execution. The policy rules may also include negative policy rules that prevent xNF 120 from having a cyclic dependency, hard-coded parameters, and/or unused parameters.

Process 300 may include other feature compliance validations in addition to or instead of those identified above. Process 300 may include tracking (at 340) any feature compliance validation variances that were detected when validating (at 320) the structure and syntactic grammar of xNF 120, when validating (at 325) the integrity of xNF 120, when validating (at 330) the security of xNF 120, when validating xNF 120 against the policy rules, and/or other feature validations. A variance may occur when validation component 210 detects a difference between what is specified in the selected (at 315) validation criteria and the definition of xNF 120. More specifically, a structural validation variance may occur when xNF 120 is missing one or more files, an integrity validation variance may occur when the checksum or signature of xNF 120 is determined to be incorrect, a security validation variance may occur when malicious code is found within xNF 120, and a policy rule variance may occur when xNF 120 is not defined with a liveness or readiness probe.

Process 300 may include performing a partial risk assessment of xNF 120 by scoring (at 345) the feature compliance variances. In some embodiments, validation component 210 may provide the tracked set of validations to risk comparator 230, and risk comparator 230 may score the variances based on a machine learning and/or artificial intelligence derived impact that each variance has on xNF 120. As noted above, risk comparator 230, via the machine learning and/or artificial intelligence, may assign different weights to the tracked variances based on the probability of each variance causing xNF 120 to fail, execute improperly, lower performance, and/or cause other aberrant behavior.

Figure 4:
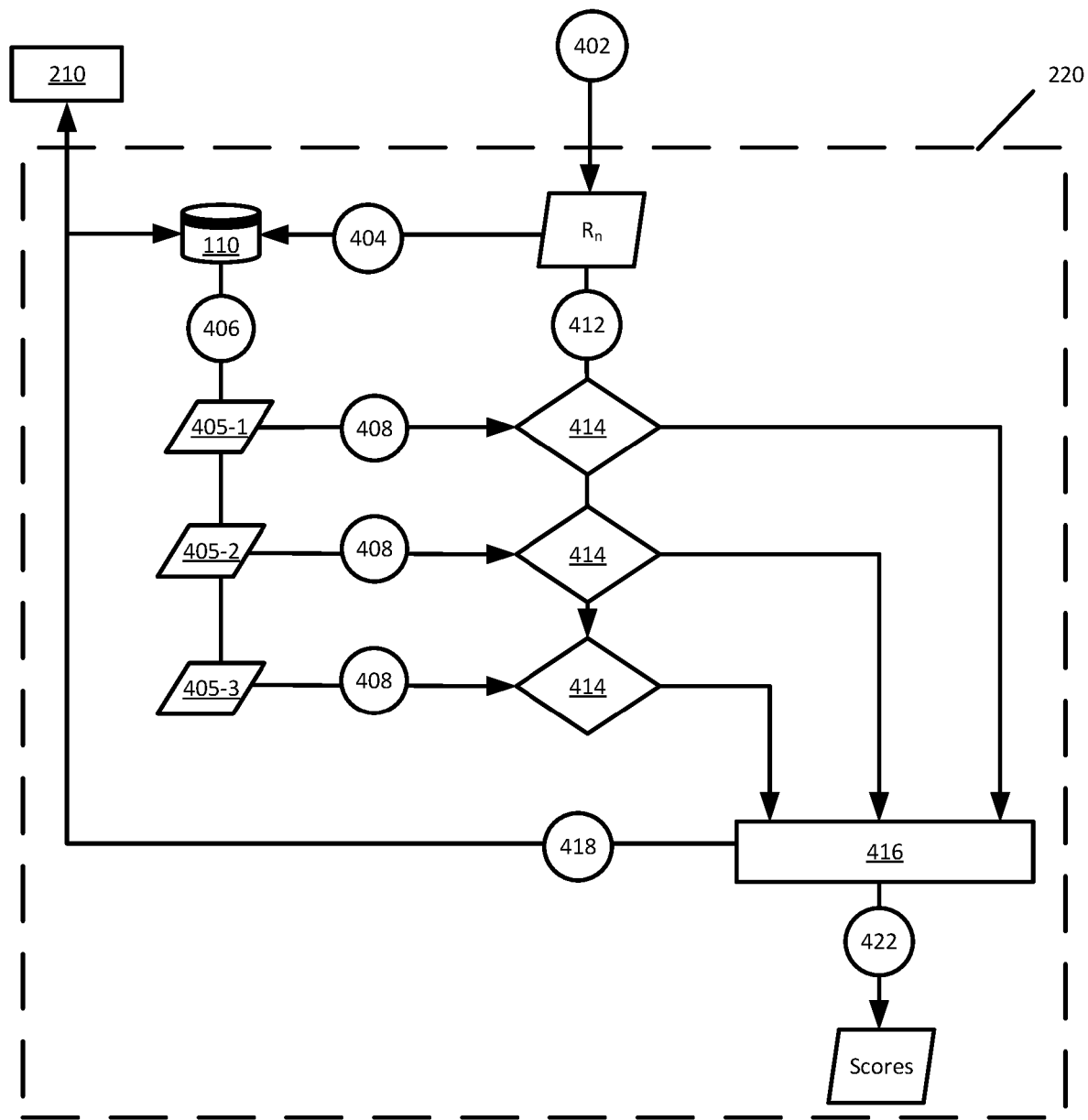
FIG. 4 illustrates an example for performing xNF performance compliance validation in accordance with some embodiments presented herein.

FIG. 4 illustrates an example for performing the performance compliance validation in accordance with some embodiments presented herein. The performance compliance validation may be performed by analytics and recommendation component 220 using data from repository 110.

As shown in FIG. 4, analytics and recommendation component 220 may receive (at 402) xNF 120 for performance compliance validation. Analytics and recommendation component 220 may receive (at 402) xNF 120 before, after, or at the same time as validation component 210, and the performance compliance validation may be performed before, after, or at the same time as the feature compliance validation.

Analytics and recommendation component 220 may classify xNF 120, and may scan (at 404) repository 110 for performance characteristics of prior versions of the same xNF 120 or performance characteristics of xNFs 120 with the same classification (e.g., xNFs 120 that provide the same network function but that were originated by different xNF originators 115). In this example, repository 110 may provide (at 406) tracked performance characteristics 405-1, 405-2, and 405-3 (sometimes collectively referred to as "performance characteristics 405" or individually as "performance characteristic 405") for three prior deployed versions or instances of xNF 120. For instance, performance characteristics 405-1 may identify the performance of a last version of xNF 120 that is currently deployed to network 130 and performance characteristics 405-2 may identify performance of a next-to-last version of xNF 120 that was deployed a month prior to network 130.

Performance characteristics 405 may identify utilization of processor, memory, network, storage, and/or other resources when each version or instance of xNF 120 was running within network 130. Performance characteristics 405 may also include tracked performance that is resource agnostic. For instance, performance characteristics 405 may include responsiveness, reliability, capacity, maximum load, average latency, and/or other measures of performance for the previous versions or instances of xNF 120.

In some embodiments, performance metrics 405, that are tracked for previous versions or instances of xNF 120, may vary depending on the network functionality provided by xNF 120 or the classification of xNF 120. In some such embodiments, analytics and performance component 220 may use (at 416) machine learning and/or artificial intelligence to determine the performance characteristics that are relevant to each xNF 120 or class of xNFs 120 and that should be tracked to repository 110 once an instance of that xNF 120 is deployed in network 130. For instance, repository 110 may track a first set of performance metrics for a first xNF providing control plane functionality, and may track a second set of performance metrics for a second xNF providing user plane functionality. As a more specific example, repository 110 may track a first set of performance metrics for a first xNF providing an AMF, and may track a second set of performance metrics for a second xNF providing a SMF. To determine the performance characteristics that are relevant to each xNF 120 or class of xNFs 120, the machine learning and/or artificial intelligence may monitor a full set of performance characteristics from previously deployed and executing instances of xNF 120, and may determine a subset of performance characteristics that are most frequently used and/or that have the greatest values during execution of xNF 120.

Analytics and recommendation component 220 may normalize (at 408) performance characteristics 405. The normalization (at 408) may include standardizing performance characteristics 405 to common set of units. For instance, analytics and recommendation component 220 may normalize (at 408) the processor utilization from performance characteristics 405 to identify processor utilization per request or other unit of measure. Similarly, the responsiveness performance characteristics may be normalized (at 408) to identify average response time for every 100 requests or user sessions.

Analytics and recommendation component 220 may generate (at 412) performance characteristics of received xNF 120. In some embodiments, the performance characteristics of received xNF 120 may be generated (at 412) via simulation or emulation of xNF 120. In some embodiments, analytics and recommendation component 220 may generate (at 412) the performance characteristics of received xNF 120 by locally executing xNF 120. For instance, analytics and recommendation component 220 may provide test traffic to the locally executing xNF 120, and the test traffic may include a sample set of production traffic received by a previous deployed instance of xNF 120 in network 130. In some embodiments, analytics and recommendation component 220 may perform canary testing of xNF 120 in order to determine its performance characteristics. The canary testing of xNF 120 may include deploying xNF 120 to run as part of network 130, routing a fractional amount of traffic to the running instance of xNF 120 (while the vast majority of traffic is routed to one or more previously deployed versions or instances of xNF 120), and monitoring the performance characteristics of xNF 120. Analytics and recommendation component 220 may normalize the performance characteristics of xNF 120 in a similar manner that performance characteristics 405 were normalized (at 408).

Analytics and recommendation component 220 may compare (at 414) the normalized performance characteristics 405 of the previous deployments to the normalized performance characteristics of the received xNF 120. Based on the comparison (at 414), analytics and performance component 220 may determine whether the newly received xNF 120 performs better or worse than prior versions or instance of the same or similar xNF 120 across each of the compared performance characteristics. For instance, analytics and performance component 220 may determine that newly received xNF 120 consumes less processor and memory resources than previously deployed versions, and/or that newly received xNF 120 has greater capacity but slower responsiveness than the previously deployed versions. A performance characteristic that is worse in newly received xNF 120 than one or more previous versions of xNF 120 may be tagged as a performance compliance variance.

Analytics and performance component 220 may use (at 416) machine learning and/or artificial intelligence to determine the impact of each performance characteristic as to the overall performance of xNF 120, and to assign different weights to the performance characteristics. To determine the impact of each performance characteristic, the machine learning and/or artificial intelligence may involve monitoring the differences in overall performance between different versions of xNF 120, monitoring the differences in individual performance characteristics between different versions of xNF 120, and modeling a predicted impact that each individual performance characteristic change had on the overall performance of xNF 120. A random forest classifier may be used to generate decision trees that identify different sets of performance characteristics that changed between different versions of xNF 120. Each decision tree path, that identifies a set of performance characteristics, may be associated with a predicted impact that the set of performance characteristics have on overall performance of xNF 120.

For example, a first decision tree path for a Home Subscriber Server ("HSS") xNF may identify that an increase in processor and/or network utilization had little or no impact on overall performance, whereas a second decision tree path for the HSS xNF may identify than an increase in memory resource utilization had a significant impact on the overall performance. Accordingly, the weight assigned to the processor and/or network utilization performance characteristics may be reduced, and the weight assigned to the memory utilization performance characteristic may be increased.

The predicted impact of each set of performance characteristics and/or of each set of changed xNF attributes described above, may be used to modify (at 418) subsequent feature compliance validation and performance compliance validation that is performed for xNF 120 and/or other xNFs 120. For instance, the machine learning and/or artificial intelligence may be used to modify (at 418) which performance characteristics are tracked for xNF 120 and the weights that are assigned to each of the tracked performance characteristics. Similarly, the machine learning and/or artificial intelligence may be used to modify (at 418) the validation criteria that is used for feature compliance validation of xNF 120. For instance, the machine learning and/or artificial intelligence may determine that certain structural validations within the validation criteria for xNF 120 have no impact on the execution of xNF 120 in network 130, and may therefore remove those structural validations from the subsequent feature compliance validation of xNF 120.

The performance compliance variances may be scored (at 422) based on the weight that is assigned to each performance characteristic of xNF 120 that performed worse than performance characteristics 405 of the previously deployed instances of xNF 120. The "worse" performance may be reflected by, for example, greater resource utilization and/or slower responsiveness when newly received xNF 120 receives a same or similar load as a previous version o of xNF 120. The resulting score may indicate the risk of increased resource utilization and/or degraded performance that may occur as a result of executing the newly received xNF 120 over the previous version of xNF 120 that is deployed in network 130.

Figure 5:
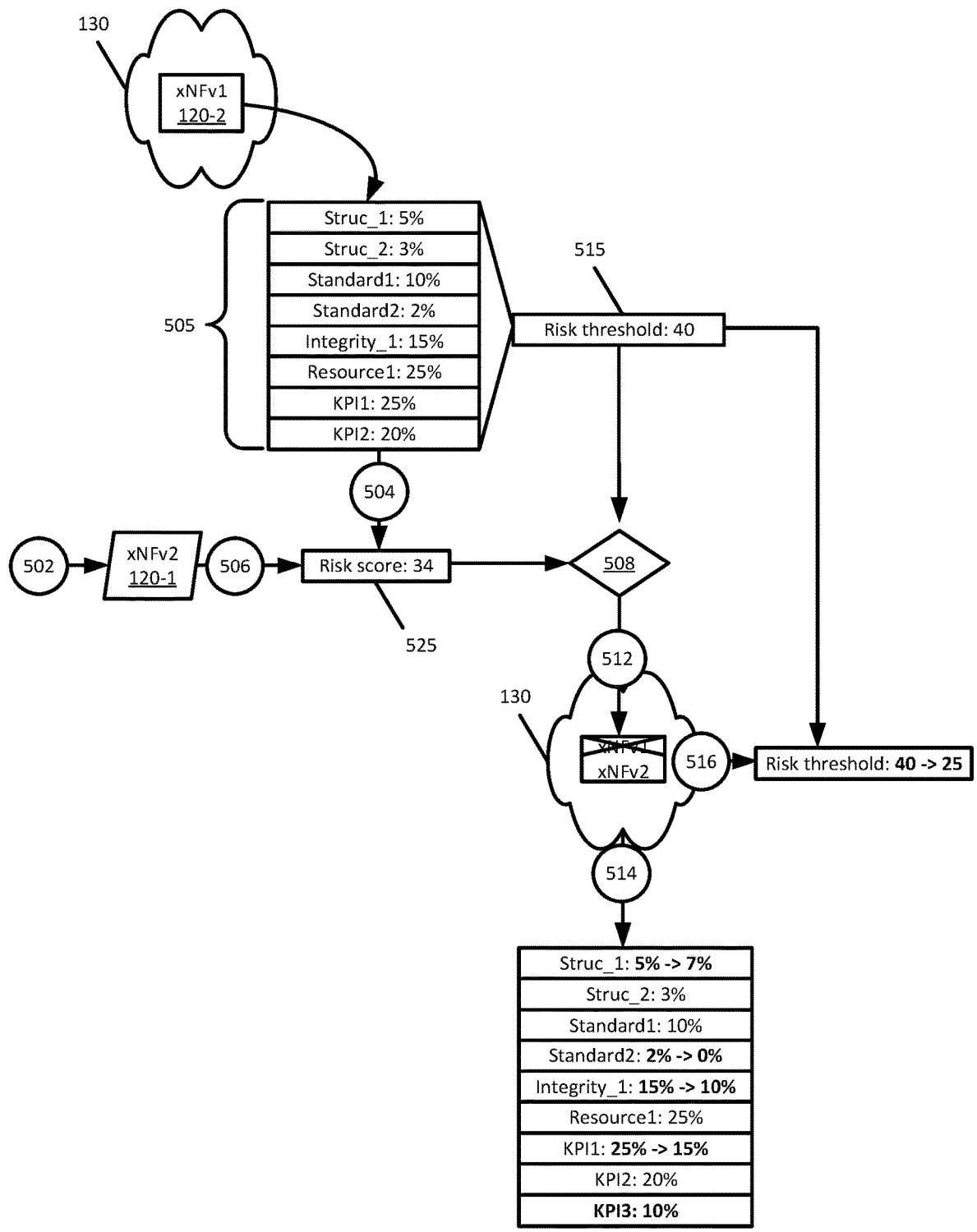
FIG. 5 illustrates an example of the xNF validation system using machine learning and/or artificial intelligence to dynamically change the validation criteria and/or performance characteristics for validating an xNF in accordance with some embodiments presented herein.

FIG. 5 illustrates an example of xNF validation system 105 using machine learning and/or artificial intelligence to dynamically change the validation criteria and/or performance characteristics for validating xNF 120 in accordance with some embodiments presented herein. As shown in FIG. 5, xNF validation system 105 may receive (at 502) a new version of xNF 120-1 (e.g., "xNFv2").

xNF validation system 105 may obtain (at 504) validation criteria 505 for xNF 120. xNF validation system 105 may obtain (at 504) validation criteria 505 by identifying the package, type, and/or network function that is virtualized by xNF 120, and by retrieving validation criteria 505 from repository 110.

Validation criteria 505 may include a set of feature compliance validations and a set of performance compliance validations that were used to validate a prior version of xNF 120-2 (e.g., "xNFv1") that has been deployed and has been running as part of network 130. Validation criteria 505 may also include a weight that is assigned to each validation. In some embodiments, validation criteria 505 may also provide risk threshold 515. Risk threshold 515 may correspond to a maximum or acceptable amount of risk that be permitted in order to deploy and execute new version of xNF 120-1 within network 130.

xNF validation system 105 may compute (at 506) risk score 525 for new version of xNF 120-1 based on validation criteria 505. For instance, risk score 525 may increase for each variance of validation criteria 505 found when performing the feature compliance validation and the performance compliance validation of new version of xNF 120-1, and the weight associated with each detected variance.

xNF validation system 105 may compare (at 508) the computed risk score 525 against risk threshold 515, and may deploy (at 512) new version of xNF 120-1 into network 130 in response to risk score 525 (e.g., the risk associated with new version of xNF 120-1) being within the acceptable or maximum amount of allowed risk for deploying new version of xNF 120-1 and/or for providing the network function of xNF 120-1 within network 130. In some embodiments, deploying (at 512) new version of xNF 120-2 may include instantiating new version of xNF 120-2 to run on configurable hardware resources and deactivating configurable hardware resources that execute prior version of xNF 120-1. In some embodiments, deploying (at 512) new version of xNF 120-2 may include reconfiguring the configurable hardware resources in order to replace prior version of xNF 120-2 that is currently being executed with new version of xNF 120-1.

xNF validation system 105 may monitor execution of the new version of xNF 120-1, and may use machine learning and/or artificial intelligence to update (at 514) validation criteria 505. For instance, the machine learning and/or artificial intelligence may determine that certain criterion used to validate xNF 120-1 has no impact on the execution of xNF 120-1, and that other criterion that was not previously used to validate xNF 120-1 has an impact on the execution of xNF 120-1 and should therefore be used to validate subsequent versions of xNF 120-1. Moreover, the machine learning and/or artificial intelligence may adjust (at 516) risk threshold 515 (e.g., the acceptable or maximum amount of allowed risk for executing xNF 120-1 within network 130) in response to identifying the xNF attributes and/or performance characteristics that impact execution of xNF 120-1.

Figure 6:
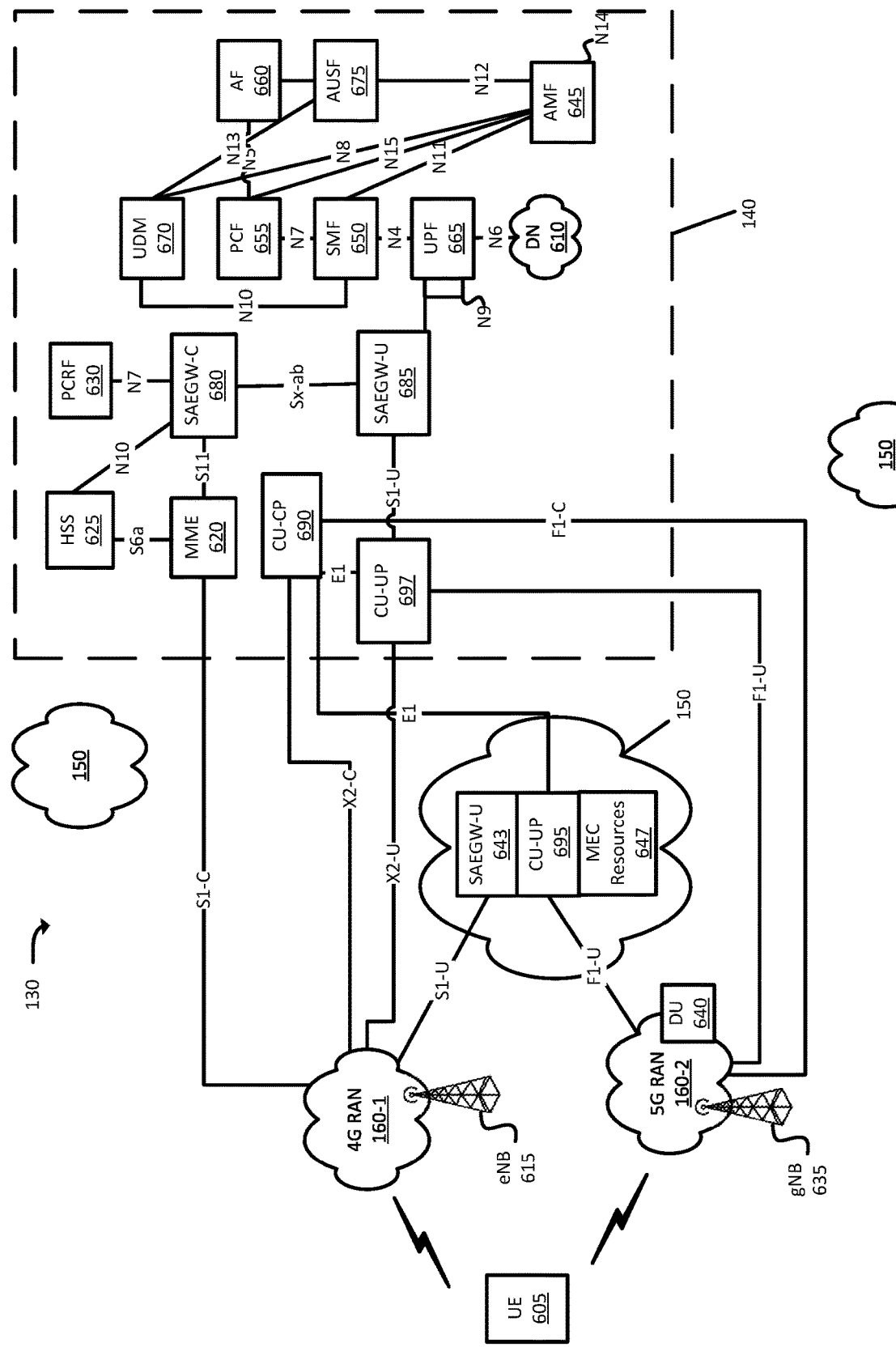
FIG. 6 illustrates examples of different network functions of a wireless telecommunications network that may be virtualized and implemented using different xNFs in accordance with some embodiments presented herein.

FIG. 6 illustrates examples of different network functions of wireless telecommunications network 130 that may be virtualized and implemented using different xNFs 120 that are successfully validated by xNF validation system 105 in accordance with some embodiments presented herein. In some embodiments, wireless telecommunications network 130 may include elements of a Fifth Generation ("5G") network. In some embodiments, wireless telecommunications network 130 may correspond to a 5G Non-Standalone ("NSA") architecture, in which a Long-Term Evolution ("LTE") radio access technology ("RAT") may be used in conjunction with a 5G core network.

As shown, wireless telecommunications network 130 may include Fourth Generation ("4G") RAN 160-1, 5G RAN 160-2, one or more distributed edge network locations 150, core network 140, and one or more external data networks ("DN") 610. Portions of wireless telecommunications network 130 may correspond to a LTE Evolved Packet System ("EPS") network, such as 4G RAN 160-1, eNodeB ("eNB") 615, Mobility Management Entity ("MME") 620, HSS 625, and Policy and Charging Rules Function ("PCRF") 630. Portions of wireless telecommunications network 130 may correspond to a 5G network, such as 5G RAN 160-2, gNodeB ("gNB") 635, Distributed Unit ("DU") 640, Centralized Units ("CUs"), AMF 645, SMF 650, Policy Control Function ("PCF") 655, Application Function ("AF") 660, User Plane Function ("UPF") 665, Unified Data Management ("UDM") 670, and Authentication Server Function ("AUSF") 675.

Moreover, wireless telecommunications network 130 is shown to have a Control and User Plane Separation ("CUPS") architecture, such that control plane and user plane functionality may be separated and/or provided by different devices or xNFs 120 that virtualize the network functions of those devices. In the CUPS architecture, the control plane may include the functions for configuring connectivity and radio resources, and the user plane may include the functions for forwarding user traffic or data packets between different devices or interfaces. For instance, the CUPS architecture may include System Architecture Evolution Gateway ("SAEGW") control plane function ("SAEGW-C") 680, SAEGW user plane function ("SAEGW-U") 685, Control Plane CU ("CU-CP") 690, and/or User Plane CU ("CU-UP") 695 and 697. While not explicitly shown in FIG. 6, wireless telecommunications network 130 may include additional, fewer, different, or differently arranged elements of the LTE EPS and/or of the 5G network.

User equipment ("UE") 605 may access services from wireless telecommunications network 130. UE 605 may include a portable computing and communication device, such as a personal digital assistant ("PDA"), a "smart" phone, a cellular phone, a laptop computer, a tablet computer, etc. UE 605 may also include a non-portable computing device, such as a desktop computer, a consumer or business appliance, a "smart" television, or another device that has the ability to connect to the wireless telecommunications network. UE 605 may, in some embodiments, include a computing and communication device that may be worn by a user (also referred to as "wearable" devices) such as a watch, a fitness band, a necklace, glasses, a ring, a belt, a headset, and/or another type of wearable device.

4G RAN 160-1 may include one or more base stations, some or all of which may take the form of eNB 615, that provide 4G radio bearers (e.g., bearers that occupy the 600 MHz-2500 MHz radio frequency ("RF") range) for UE 605 and/or other UEs that have 4G radios and are in range of 4G RAN 160-1. 5G RAN 160-2 may include one or more base stations, some or all of which may take the form of gNB 635, that provide 5G radio bearers (e.g., bearers that occupy the 600 MHz-6 GHz RF range, bearers that occupy a 30 GHz-300 GHz RF range (sometimes referred to as "millimeter wave" or "mmWave"), and/or bearers that utilize some other suitable RF range) for UE 605 and/or other UEs that have 5G radios and are in range of 5G RAN 160-2.

DU 640 may operate in conjunction with one or more CUs that may be associated with edge network location 150 and/or core network 140. DU 640 may provide 5G control plane and user plane functions that are not performed by the CUs (e.g., may handle traffic processing at lower layers than is handled by CUs).

Edge network location 150 may include localized Multi-access Edge Computing ("MEC") resources 647 that are part of or are physically located near physical components of RANs 160-1, 160-2, and/or other RANs (e.g., near one or more eNBs 615, gNBs 635, DUs 640, etc.). In particular, edge network location 150 may be faster to access (e.g., via fewer network hops) from 4G RAN 160-1 and/or 5G RAN 160-2 than core network 140. MEC resources 647 may include one or more devices or systems that provide caching resources for localized delivery of content and services, compute resources for localized execution of functions and services, and/or other resources for localized access to services that may be requested and/or accessed by UEs 605. For instance, MEC resources 647 may be used to provide various services with low latency (e.g., less than about 10 milliseconds) and high reliability to UE 605, because of the geographic proximity of MEC resources 647 to 4G RAN 160-1 and/or 5G RAN 160-2 that may be used by UE 605 to request and access services. "Low latency services" may include services that require less than 20 milliseconds of latency. For instance, low latency services may include edge computing services that control autonomous vehicles or robots, and/or other devices or systems operating in real-time. In contrast, "latency insensitive services" may include services that are not affected by latencies greater than 20 milliseconds. For instance, latency insensitive services may include website access, email access, video/streaming access, or the like. Latency insensitive services may be provided using the resources of core network 140 and external data networks 610 without degrading the user experience, whereas MEC resources 647 of edge network location 150 may be limited (e.g., relative to resources of core network 140 and/or DN 610), and therefore may be selectively allocated to specific UEs 605 and/or specific services (e.g., low latency services).

In some embodiments, edge network location 150 may include SAEGW-U 643 and/or CU-UP 695. SAEGW-U 643 may provide Packet Data Network ("PDN") Gateway ("P-GW") and Serving Gateway ("S-GW") 4G user plane functions for edge network location 150. For instance, SAEGW-U 643 may control the user plane traffic coming into and out of edge network location 150 via eNB 615 by establishing the bearers that allow UEs to access services provided by MEC resources 647 of edge network location 150 from 4G RAN 160-1. In some embodiments, SAEGW-U 643 may be a logical device that represents separate user plane S-GW and P-GW devices operating in edge network location 150. In some embodiments, SAEGW-U 643 may be a single device, system, xNF 120, etc., that combines the functionality of user plane S-GW and P-GW devices. CU-UP 695 may control 5G user plane functions for edge network location 150 by controlling the user plane traffic coming into and out of edge network location 150 via gNB 635. Accordingly, CU-UP 695 may establish the bearers that allow UE 605 to access services provided by MEC resources 647 of edge network location 150 via 5G RAN 160-2. In some embodiments, SAEGW-U 643 and CU-UP 695 may be implemented by different devices, systems, or xNFs 120. In some embodiments, SAEGW-U 643 and CU-UP 695 may be a single device, system, xNF 120, etc. that performs the 4G and 5G user plane functions.

SAEGW-C 680 may include one or more devices or xNFs 120 within core network 140 that control and/or perform control plane functionality for service provided via 4G RAN 160-1. In particular, SAEGW-C 680 may perform the control plane functions of S-GW and P-GW devices, including directing SAEGW-U 643, SAEGW-U 685, and/or other SAEGW-Us in the establishment of the 4G user plane bearers (e.g., user plane bearers established via 4G RAN 160-1).

SAEGW-U 685 may create and manage the bearers that are established with eNBs (e.g., eNB 615), and that are used to exchange user plane traffic between the eNBs and the resources, devices, systems, xNFs 120, and/or services that are accessible from core network 140 and/or DN 610. In the CUPS architecture illustrated by FIG. 6, SAEGW-C 680 and SAEGW-U 685 may operate as separate devices or xNFs 120. In some embodiments, SAEGW-C 680 and SAEGW-U 685 may operate as a single device, system, xNF 120, etc., that performs a logical split of the control plane and user plane functions.

CU-CP 690 may include one or more devices or xNFs 120 within core network 140 that configure the 5G control plane (e.g., control plane signaling associated with 5G RAN 160-2). CU-CP 690 may direct CU-UP 695, CU-UP 697, and/or other CU-CPs in the establishment of the 5G user plane bearers (e.g., via 5G RAN 160-2). In some embodiments, the 4G and 5G control plane functions performed by SAEGW-C 680 and CU-CP 690 may be combined and performed from a single device, system, xNF 120, etc., that operates in core network 140.

CU-UP 697 may include one or more devices or xNFs 120 that create and manage the bearers that are established with gNBs (e.g., gNB 635). Accordingly, CU-UP 697 may facilitate the exchange of user plane traffic between gNBs and the resources, devices, systems, and/or services that are accessible from core network 140 and/or DN 610.

MME 620 may include one or more computation and communication devices or xNFs 120 that act as a control node for eNB 615, gNB 635, and/or other devices that provide the air interface for wireless telecommunications network 130. For example, MME 620 may perform operations to register UE 605 with wireless telecommunications network 130, to establish bearer channels associated with a session with UE 605, to hand off UE 605 to a different eNB 615 or gNB 635, MME 620, or another network, and/or to perform other operations.

HSS 625 may include one or more devices or xNFs 120 that may manage, update, and/or store, in a memory associated with HSS 625, profile information associated with a user or subscriber (e.g., a subscriber associated with UE 605). The profile information may include identifiers that identify applications and/or services that are permitted for and/or accessible by the subscriber, identifying information for UE 605, bandwidth or data rate thresholds associated with the applications and/or services, priority class information, and/or other information. Additionally, or alternatively, HSS 625 may perform authentication, authorization, and/or accounting operations associated with the subscriber and/or a communication session with UE 605.

PCRF 630 may include one or more devices or xNFs 120 that may receive information regarding policies and/or subscriptions from one or more sources, such as subscriber databases and/or from one or more users. PCRF 630 may provide these policies and/or policy identifiers to SAEGW-C 680 or another device or xNF 120 so that the policies can be enforced.

AMF 645 may include one or more devices, systems, xNFs 120, etc., that perform operations to register UE 605 with the 5G network, to establish bearer channels associated with a PDU session with UE 605, to hand off UE 605 from the 5G network to another network, to hand off UE 605 from the other network to the 5G network, and/or to perform other operations.

SMF 650 may include one or more devices, systems, xNFs 120, etc., that gather, process, store, and/or provide information in a manner described herein. SMF 650 may, for example, facilitate in the establishment of communication sessions on behalf of UE 605. In some embodiments, the establishment of communications sessions may be performed in accordance with one or more policies provided by PCF 655.

PCF 655 may include one or more devices, systems, xNFs 120, etc., that aggregate information to and from the 5G network and/or other sources. PCF 655 may receive information regarding policies and/or subscriptions from one or more sources, such as subscriber databases and/or from one or more users (such as, for example, an administrator associated with PCF 655).

AF 660 may include one or more devices, systems, xNFs 120, etc., that receive, store, and/or provide information that may be used in determining parameters (e.g., quality of service parameters, charging parameters, or the like) for certain applications.

UPF 665 may include one or more devices, systems, xNFs 120, etc., that receive, store, and/or provide data (e.g., user plane data). For example, UPF 665 may receive user plane data (e.g., voice call traffic, data traffic, etc.), destined for UE 605, from DN 610, and may forward the user plane data toward UE 605 (e.g., via 4G RAN 160-1, SAEGW-U 685, and/or one or more other devices). Similarly, UPF 665 may receive traffic from UE 605 (e.g., via RAN 160-1, SAEGW-U 685, and/or one or more other devices), and may forward the traffic toward DN 610.

UDM 670 and AUSF 675 may include one or more devices, systems, xNFs 120, etc., that manage, update, and/or store profile information associated with one or more subscribers. UDM 670 and/or AUSF 675 may perform authentication, authorization, and/or accounting operations associated with the subscriber and/or a communication session with UE 605. One or more of these devices, systems, and/or xNFs 120 may maintain information indicating particular QoS levels that are associated with particular subscribers. In some embodiments, the QoS information may also be maintained on a per-traffic type basis, a per-device type basis, and/or some other basis. In this manner, UDM 670 and/or AUSF 675 may be involved in processes where a QoS level for a given UE, subscriber, traffic flow, etc. is to be determined or verified.

DN 610 may include one or more wired and/or wireless networks. For example, DN 610 may include an IP-based PDN, a wide area network ("WAN") such as the Internet, a private enterprise network, and/or one or more other networks. UE 605 may communicate, through DN 610, with data servers, other UEs, and/or to other servers or applications that are coupled to DN 610. DN 610 may be connected to one or more other networks, such as a public switched telephone network ("PSTN"), a public land mobile network ("PLMN"), and/or another network. DN 610 may be connected to one or more devices, such as content providers, applications, web servers, and/or other devices, with which UE 605 may communicate.

The quantity of devices, virtualized network functions, and/or networks, illustrated in FIG. 6, is provided for explanatory purposes only. In practice, wireless telecommunications network 130 may include additional devices, virtualized network functions, and/or networks; fewer devices, virtualized network functions, and/or networks; different devices, virtualized network functions, and/or networks; or differently arranged devices, virtualized network functions, and/or networks than illustrated in FIG. 6. For example, while not shown, wireless telecommunications network 130 may include devices or xNFs 120 that implement one or more of a Network Data Analytics Function ("NWDAF"), a NF Repository Function ("NRF"), a Network Exposure Function ("NEF"), a Service Capability Exposure Function ("SCEF"), a Charging Function ("CHF"), a Subscriber Location Function ("SLF"), or a Diameter Routing Agent ("DRA").

NWDAF may include one or more devices, systems, xNFs 120, etc., that provides network analysis information in response to requests from other network functions. NRF may include one or more devices, systems, xNFs 120, etc., that support the service discovery function and/or that maintain the profiles of the available NF instances and their supported services in the 5G core network. NEF may include one or more devices, systems, xNFs 120, etc., for securely exposing the services and capabilities provided by 3GPP network functions. SCEF may include one or more devices, systems, xNFs 120, etc., for service capability exposure and/or for providing a secure gateway interface between UEs and application servers that process and control information exchanged with the UEs. CHF may include one or more devices, systems, xNFs 120, etc., that provide billing services based on tracked network utilization. SLF may include one or more devices, systems, xNFs 120, etc., that operate in conjunction with the HSS in order to determine which HSS holds the subscriber profile for a particular UE. DRA may include one or more devices, systems, xNFs 120, etc., that ensure proper routing of messages among the correct elements in network 130 and/or may divide traffic based on various policies.

Moreover, while not shown, wireless telecommunications network 130 may include devices or xNFs 120 that facilitate or enable communication between various components shown in wireless telecommunications network 130, such as routers, modems, gateways, switches, hubs, etc. Alternatively, or additionally, one or more of the devices or xNFs 120 of wireless telecommunications network 130 may perform one or more functions described as being performed by another device or xNF 120 of wireless telecommunications network 130. Additionally, the devices or xNFs 120 of wireless telecommunications network 130 may interconnect with each other, and/or other devices or xNFs 120, via wired connections, wireless connections, or a combination of wired and wireless connections. In some embodiments, one or more devices or xNFs 120 of wireless telecommunications network 130 may be physically integrated in, and/or may be physically attached to, one or more other devices or xNFs 120 of wireless telecommunications network 130. Also, while "direct" connections are shown in FIG. 6 between certain devices or xNFs 120, some devices or xNFs 120 may communicate with each other via one or more additional devices and/or networks.

Figure 7:
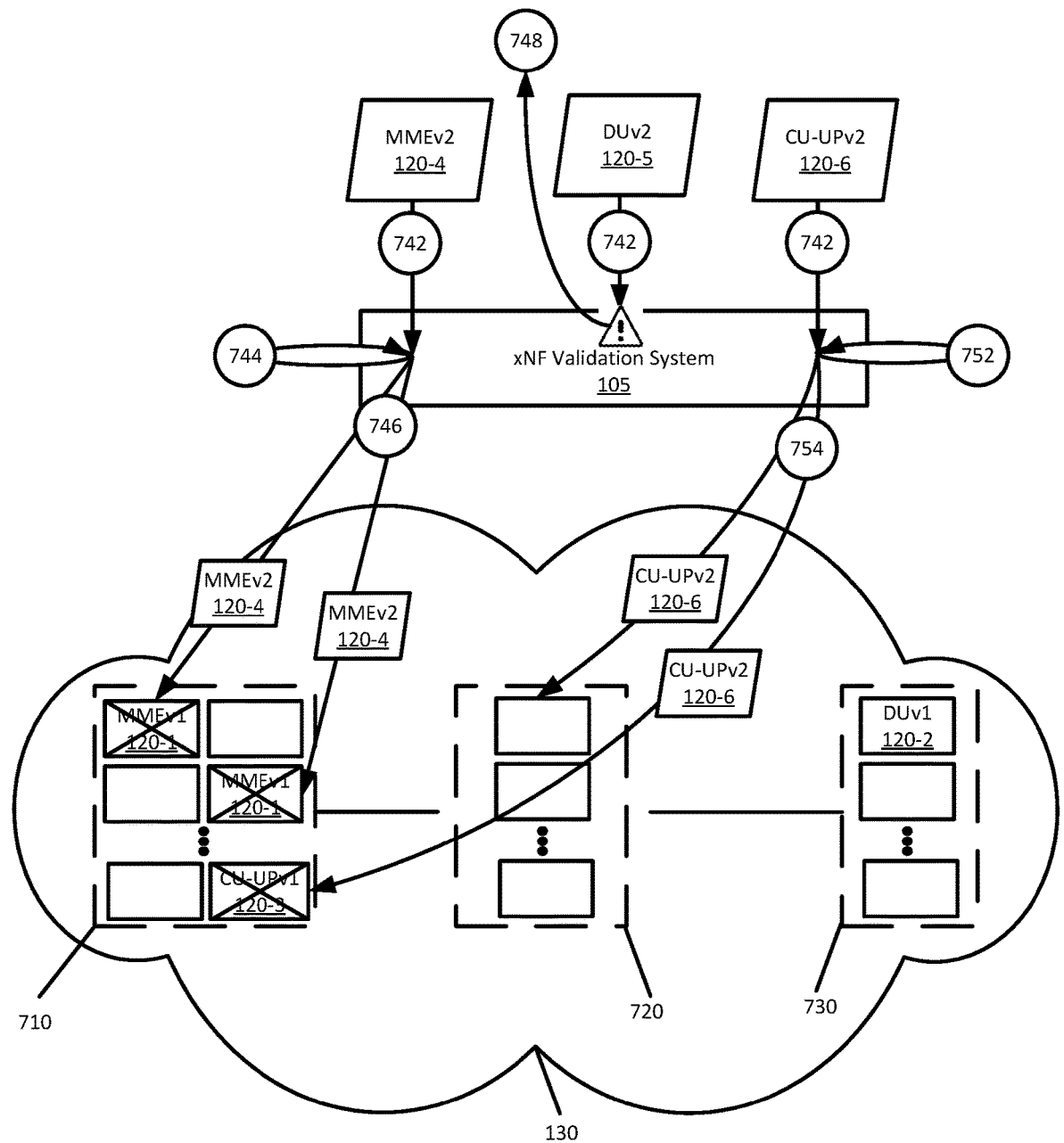
FIG. 7 illustrates an example of the xNF validation system orchestrating the deployment and virtualization of different network functions in a wireless telecommunications network in accordance with some embodiments presented herein.

FIG. 7 illustrates an example of xNF validation system 105 orchestrating the deployment and virtualization of different network functions in wireless telecommunications network 130 in accordance with some embodiments presented herein. As shown in FIG. 7, wireless telecommunications network 130 may include configurable hardware resources that are located at different locations or physical sites 710, 720, and 730. The resources of site 710 may be used to virtualize network functions for the core network of network 130, the resources of site 720 may be used to virtualize network functions for a particular edge network location of network 130, and the resources of site 730 may be used to virtualize network functions for a particular RAN of network 130. For instance, a first set of resources at site 710 may be configured with MME-xNF 120-1 that virtualizes MME network functions, a second set of resources at site 730 may be configured with DU-xNF 120-2 that virtualizes DU network functions, and a third set of resources at site 710 may be configured with CU-UP-xNF 120-3 that virtualizes CU-UP network functions.

xNF validation system 105 may receive (at 742) updated second versions of MME-xNF 120-4, DU-xNF 120-5, and CU-UP-xNF 120-6. xNF validation system 105 may successfully validate (at 744) second version of MME-xNF 120-4, wherein the successful validation (at 744) may include determining a first amount of risk for MME-xNF 120-4 based on validation criteria, determining a second amount of risk for MME-xNF 120-4 based on performance characteristics, and determining that the total amount of risk associated with MME-xNF 120-4 is within an acceptable risk threshold. Accordingly, xNF validation 105 may deploy (at 746) MME-xNF 120-4 to run within site 710.

The deployment (at 746) may include xNF validation system 105 identifying which resources in site 710 are configured to execute first version of MME-xNF 120-1. In some embodiments, xNF validation system 105 may track the deployment of xNFs to sites 710, 720, and 730, and to specific hardware or resources within those sites, via a mapping table. The mapping table may map a resource identifier, that identifies a network address or identifier of a device executing one or more xNFs, to one or more xNF identifiers that identify the one or more xNFs that execute using the resources associated with the resource identifier and/or that can be used to access the executing xNFs. As shown in FIG. 7, xNF validation system 105 may determine that first version of MME-xNF 120-1 has been deployed to run using a first set of resources of two devices in site 710. xNF validation system 105 may reconfigure the first set of resources so that the first set of resources are reallocated to execute second version of MME-xNF 120-4 instead of first version of MME-xNF 120-1.

xNF validation system 105 may perform a staggered deployment of second version of MME-xNF 120-4. In some embodiments, the staggered deployment may involve replacing first version of MME-xNF 120-1 on one device before replacing first version of MME-xNF 120-1 on another device. In some embodiments, the staggered deployment may involve activating second version of MME-xNF 120-4 on an unused fourth set of resources at site 710 before deactivating first version of MME-xNF 120-1 on the first set of resources at site 710, and modifying a routing configuration so that traffic that was previously routed to the first set of resources (e.g., first version of MME-xNF 120-1) is routed to the fourth set of resources (e.g., second version of MME-xNF 120-4).

As also shown in FIG. 7, xNF validation system 105 may be unable to validate second version of DU-xNF 120-5 because of too many compliance variances and the risk score of second version of DU-xNF 120-5 indicating worse performance or unreliable performance relative first version of DU-xNF 120-2. Accordingly, xNF validation system 105 may allow first version of DU-xNF 120-2 to continue execution on resources at site 730 and may prevent the deployment of second version of DU-xNF 120-5. xNF validation system 105 may provide (at 748) the xNF originator for second version of DU-xNF 120-5 with an alert and/or recommendation to ameliorate the issues that prevented deployment of second version of DU-xNF 120-5 into network 130.

xNF validation system 105 may successfully validate (at 752) second version of CU-UP-xNF 120-6, and may determine that the previous deployment for first version of CU-UP-xNF 120-3 in site 710 was insufficient to handle the load associated with the CU-UP network function. Accordingly, xNF validation system 105 may allocate additional resources for the CU-UP network function. For instance, xNF validation system 105 may configure (at 754) a fifth set of resources in site 720 to perform the CU-UP network function in addition to the existing third set of resources in site 710. In particular, xNF validation system 105 may identify the fifth set of resources at site 720 as being unused, available, and/or under-utilized resources, and may instantiate second version of CU-UP-xNF 120-6 on the fifth set of resources. xNF validation system 105 may also reconfigure the third set of resources at site 710 to execute second version of CU-UP-xNF 120-6 in place of first version of CU-UP xNF.

Figure 8:
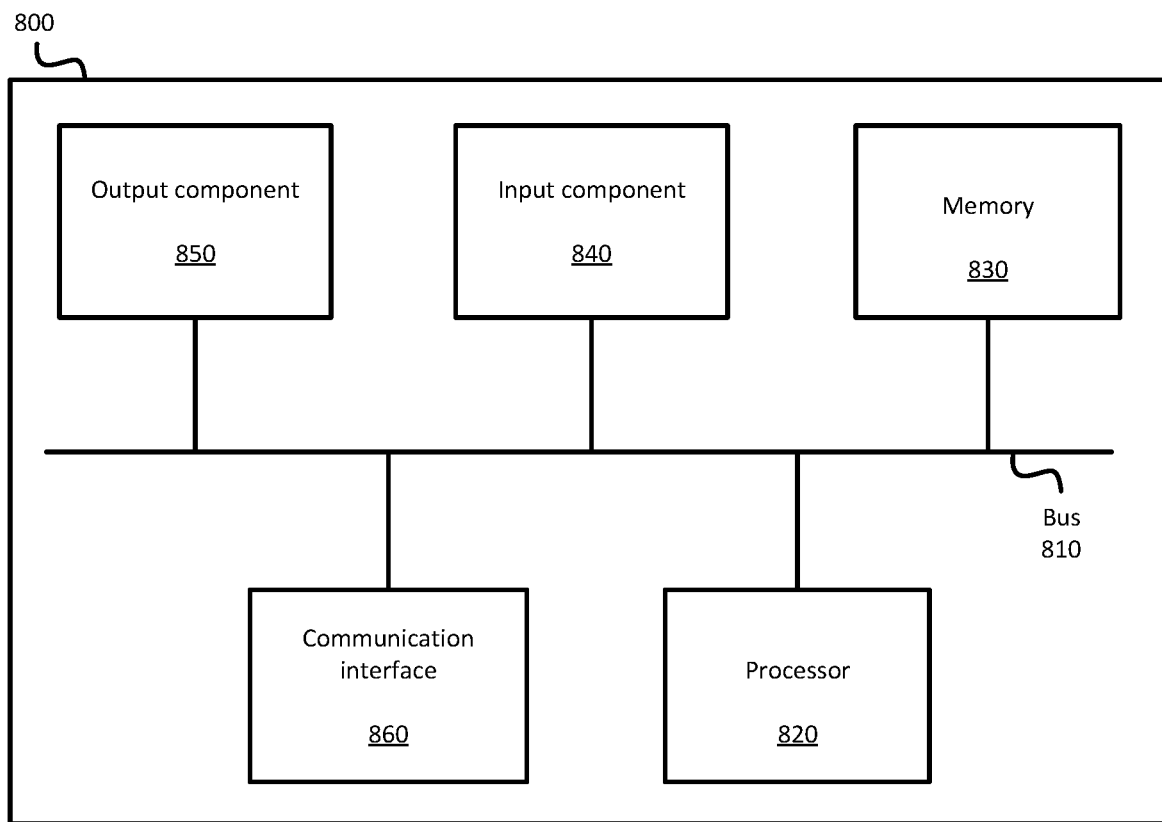
FIG. 8 illustrates example functional components of one or more devices, in accordance with one or more embodiments described herein.

FIG. 8 illustrates example components of device 800. One or more of the devices described above may include one or more devices 800 (e.g., xNF validation system 105 and resources, devices, and/or configurable hardware resources used to execute network functions of different xNFs 120). Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1, 3, 4, 5, and 7), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising: one or more processors configured to: receive a package comprising a software-defined network function ("xNF") that virtualizes a particular network function of a network; classify the xNF based on one or more of the particular network function, an xNF identifier, or metadata of the xNF; select validation criteria for the xNF from a plurality of validation criteria and a set of performance characteristics of one or more prior xNFs virtualizing the same particular network function in response to classifying the xNF, wherein the validation criteria for the xNF comprises feature-compliant attributes of xNFs providing the particular network function; determine a first amount of risk based on one or more differences between the xNF and the validation criteria; determine a second amount of risk by comparing a set of performance characteristics of the xNF to the set of performance characteristics of the one or more prior xNFs virtualizing the same particular network function; provide the package to the network for deployment in response to the first amount of risk and the second amount of risk being within an acceptable amount of risk; and prevent deployment of the package into the network in response the first amount of risk and the second amount of risk exceeding the acceptable amount of risk.

2. The device of claim 1, wherein the xNF includes at least one of: a virtualized network function ("vNF") or a containerized network function ("cNF").

3. The device of claim 1, wherein the particular network function virtualized by the xNF includes at least one of: a control plane function of the network or a user plane function of the network.

4. The device of claim 1, wherein the xNF implements at least one of: a Mobility Management Entity ("MME"), a Home Subscriber Server ("HSS"), a Policy and Charging Rules Function ("PCRF"), an Access and Mobility Management Function ("AMF"), a Session Management Function ("SMF"), a Policy Control Function ("PCF"), an Application Function ("AF"), a User Plane Function ("UPF"), a Unified Data Management ("UDM"), an Authentication Server Function ("AUSF"), a Network Data Analytics Function ("NWDAF"), a NF Repository Function ("NRF"), a Network Exposure Function ("NEF"), a Service Capability Exposure Function ("SCEF"), a Charging Function ("CHF"), a Subscriber Location Function ("SLF"), or a Diameter Routing Agent ("DRA").

5. The device of claim 1, wherein the one or more processors are further configured to: detect a first set of differences between a first structure of the xNF and a second structure defined in the validation criteria; and increase the first amount of risk based on the first set of differences.

6. The device of claim 5, wherein the one or more processors are further configured to: detect a second set of differences between a first set of features included as part of the xNF and a second set of features defined for the particular network function by the network; and increase the first amount of risk based on the second set of differences.

7. The device of claim 5, wherein the one or more processors are further configured to: detect a set of compliance variances based on one or more of an integrity and a security of the xNF differing from a set of requirements specified for the integrity and the security in the validation criteria; increase the first amount of risk based on the set of compliance variances.

8. The device of claim 5, wherein determining the second amount of risk comprises: identifying a particular performance characteristic of the xNF that is worse performing than the particular performance characteristic of the one or more prior xNFs; and increase the second amount of risk based on a weight assigned to the particular performance characteristic.

9. The device of claim 1, wherein the one or more processors are further configured to: deploy the package into the network as a result of providing the package to the network for deployment, wherein deploying the package comprises: selecting a set of configurable resources; and executing the particular network function virtualized by the xNF of the package using the set of configurable resources.

10. The device of claim 9, wherein the one or more processors are further configured to: monitor the xNF; remove first criterion of the validation criteria in response to determining that aberrant behavior of the xNF, that occurs while monitoring the xNF, is not caused by the first criterion; and add second criterion to the validation criteria in response to determining that the aberrant behavior of the xNF is caused by the second criterion.

11. The device of claim 9, wherein the one or more processors are further configured to: monitor the xNF; increase an amount of risk contributed by a first performance characteristic of the set of performance characteristics to the second amount of risk in response to determining greater utilization of the first performance characteristic than a second performance characteristic of the set of performance characteristics from monitoring the xNF; and decrease an amount of risk contributed by the performance characteristic to the second amount of risk in response to determining lesser utilization of the second performance characteristic than the first performance characteristic from monitoring the xNF.

12. The device of claim 1, wherein the set of performance characteristics corresponds to utilization of one or more processing, memory, storage, and network resources.

13. The device of claim 1, wherein the one or more processors are further configured to: generate the set of performance characteristics of the one or more prior xNFs after deploying packages for the one or more prior xNFs into the network and the one or more prior xNFs providing the particular network function for the network; and generate the set of performance characteristics of the xNF by executing the particular network function of the xNF separate from the one or more prior xNFs providing the particular network function of the network.

14. The device of claim 1, wherein the xNF implements at least one of: a Distributed Unit ("DU"), a control plane Centralized Unit ("CU-UP"), or a user plane CU ("CU-CP"), a System Architecture Evolution Gateway ("SAEGW") control plane function ("SAEGW-C"), or a SAEGW user plane function ("SAEGW-U").

15. The device of claim 1, wherein preventing the deployment of the package comprises: providing a notification to an originator of the package, the notification identifying at least one of the set of performance characteristics or the one or more differences between the xNF and the validation criteria.

16. A non-transitory computer-readable medium, storing a plurality of processor-executable instructions to: receive a package comprising a software-defined network function ("xNF") that virtualizes a particular network function of a network; classify the xNF based on one or more of the particular network function, an xNF identifier, or metadata of the xNF; select validation criteria for the xNF from a plurality of validation criteria and a set of performance characteristics of one or more prior xNFs virtualizing the same particular network function in response to classifying the xNF, wherein the validation criteria for the xNF comprises feature-compliant attributes of xNFs providing the particular network function; determine a first amount of risk based on one or more differences between the xNF and the validation criteria; determine a second amount of risk by comparing a set of performance characteristics of the xNF to the set of performance characteristics of the one or more prior xNFs virtualizing the same particular network function; provide the package to the network for deployment in response to the first amount of risk and the second amount of risk being within an acceptable amount of risk; and prevent deployment of the package into the network in response the first amount of risk and the second amount of risk exceeding the acceptable amount of risk.

17. The non-transitory computer-readable medium of claim 16, wherein the xNF includes at least one of a virtualized network function ("vNF") or a containerized network function ("cNF").

18. The non-transitory computer-readable medium of claim 17, wherein the xNF implements at least one of: a Mobility Management Entity ("MME"), a Home Subscriber Server ("HSS"), a Policy and Charging Rules Function ("PCRF"), an Access and Mobility Management Function ("AMF"), a Session Management Function ("SMF"), a Policy Control Function ("PCF"), an Application Function ("AF"), a User Plane Function ("UPF"), a Unified Data Management ("UDM"), an Authentication Server Function ("AUSF"), a Network Data Analytics Function ("NWDAF"), a NF Repository Function ("NRF"), a Network Exposure Function ("NEF"), a Service Capability Exposure Function ("SCEF"), a Charging Function ("CHF"), a Subscriber Location Function ("SLF"), or a Diameter Routing Agent ("DRA").

19. A method, comprising: receiving a package comprising a software-defined network function ("xNF") that virtualizes a particular network function of a network; classifying the xNF based on one or more of the particular network function, an xNF identifier, or metadata of the xNF; selecting validation criteria for the xNF from a plurality of validation criteria and a set of performance characteristics of one or more prior xNFs virtualizing the same particular network function in response to classifying the xNF, wherein the validation criteria for the xNF comprises feature-compliant attributes of xNFs providing the particular network function; determining a first amount of risk based on one or more differences between the xNF and the validation criteria; determining a second amount of risk by comparing a set of performance characteristics of the xNF to the set of performance characteristics of the one or more prior xNFs virtualizing the same particular network function; providing the package to the network for deployment in response to the first amount of risk and the second amount of risk being within an acceptable amount of risk; and preventing deployment of the package into the network in response the first amount of risk and the second amount of risk exceeding the acceptable amount of risk.

20. The method of claim 19, wherein preventing the deployment of the package comprises: providing a notification to an originator of the package, the notification identifying at least one of the set of performance characteristics or the one or more differences between the xNF and the validation criteria.

* * * * *